United States Patent [19]

Ovshinsky et al.

[11] Patent Number: 4,788,593
[45] Date of Patent: Nov. 29, 1988

[54] HIGH RESOLUTION SCANNING SYSTEM INCLUDING OPTICAL ENLARGEMENT

[75] Inventors: Stanford R. Ovshinsky, Bloomfield Hills; Lawrence G. Norris, West Bloomfield, both of Mich.

[73] Assignee: Energy Conversion Devices, Inc., Troy, Mich.

[21] Appl. No.: 918,953

[22] Filed: Oct. 15, 1986

[51] Int. Cl.$^4$ ............................................. H04N 3/14
[52] U.S. Cl. ........................... 358/213.13; 358/213.11
[58] Field of Search ............. 358/294, 213.11, 213.23, 358/213.27, 213.28, 213.31, 292, 213.13; 250/578

[56] References Cited

U.S. PATENT DOCUMENTS 4,607,168 8/1986 Oritsuki et al. ................ 358/213.11
4,660,095 4/1987 Cannella et al. ................... 358/294

Primary Examiner—Jin F. Ng
Assistant Examiner—Stephen Brinich
Attorney, Agent, or Firm—Marvin S. Siskind; Richard M. Goldman; Kenneth M. Massaroni

[57] ABSTRACT

A method for the high resolution sensing of a pattern of information so as to provide an output signal corresponding thereto includes the novel steps of optically generating an enlarged image of the pattern of information and sensing that enlarged image with a thin film photosensor array. By the use of optical enlargement, the effective resolution of the sensor array is increased. Apparatus utilizing this method may be employed in conjunction with printers or display devices to provide high resolution images of information being scanned.

19 Claims, 2 Drawing Sheets

HIGH RESOLUTION SCANNING SYSTEM INCLUDING OPTICAL ENLARGEMENT

FIELD OF THE INVENTION

This invention relates generally to image scanning systems and, more particularly, to electronic imaging systems which include therein a thin film photosensor array and which are adapted to detect a pattern of information and provide an output signal corresponding thereto.

BACKGROUND OF THE INVENTION

Optical scanning systems are enjoying ever-growing utility in a variety of products and for a diversity of applications. For the purpose of understanding the subject invention "image or optical scanners" are defined as systems including one or more photosensor arrays operatively disposed to scan a pattern of information or data and generate electrical signals corresponding thereto.

Optical scanners may be readily adapted to address a wide variety of data inputs. The data may be a pattern of graphic information in the form of a photograph, a drawing, a design on fabric or the like, or the information being scanned may be alpha-numeric data such as printed or written matter. In other instances, the information may be a three dimensional pattern, such as the surface of a solid. Basically, optical scanners convert a pattern of data into electrical signals which may be supplied to downstream apparatus for further processing, storage or display. Image scanners are incorporated into facsimile machines, copying machines, computer input terminals, CAD-CAM systems and the like. Additionally, image scanners are utilized in production processes to inspect surfaces of materials such as plywood, fabric, plastic's textile, and metal. The typical image scanner includes one or more photoresponsive circuits configured and disposed so as to either simultaneously or sequentially address various portions of the surface being scanned.

Currently, there are several basic approaches currently pursuant to which image scanners operate. Charge coupled devices (CCDs) form the basis for one such approach. CCD's are solid state devices, typically formed from single crystal silicon and include therein an array of photosensor elements. CCDs have a high degree of photosensitivity and are capable of providing high resolution. However, CCDs are relatively small in size; the typical CCD array is a two dimensional matrix approximately one centimeter square, and the largest CCDs currently produced are one dimensional arrays no greater than approximately 3 to 4 inches in length. These size contraints impose restrictions on the utility of CCDs in scanners. In those instances where a pattern of information having dimensions larger than that of the CCD is being scanned, an optical system must be utilized to project that pattern of information at a reduced size onto the surface of the CCD. Such optical systems will effectively reduce the resolution of the CCD.

In addition to the loss of resolution introduced by the optical system itself, the actual reduction process degrades the effective resolution of the pattern of information being sensed. For example, a typical two dimensional CCD array is one centimeter square and includes therein 256,000 photosensor units, generally referred to as pixels. To translate this into photographic terminology, the equivalent resolution would be about 50 lines/mm for the one centimeter square CCD array. If a pattern of information occupying an area of 35×35 millimeters were projected down onto this one centimeter square charge coupled device, the effective resolution of the 35 millimeter square image would fall to approximately 15 lines/mm. For the sake of comparison, medium resolution photographic film is generally capable of resolving approximately 120 lines/mm. Efforts to improve resolution using single crystal integrated circuits encounter at least two significant problems. The first is that integrated circuit chips formed on single crystal silicon wafers must be as small as possible to enable acceptable yields and to meet requirements of economical manufacturing. The second problem, related to the first, is that in order to increase the packing density in the small available chip area, finer and finer photolithography must be used with resulting increases in the cost of manufacture. For these reasons, among others, high resolution sensing (high resolution being defined relative to photographic capabilities) of patterns of information of practical size with present CCD technology is not economically achievable.

With improvements in lithographic techniques it is anticipated that one centimeter square CCDs may ultimately be fabricated to include 1.4 million pixels therein. This translates to a resolution of approximately 120 lines/mm on the one centimeter square device and a corresponding effective resolution of 34 lines/mm for a 35 millimeter square pattern of information projected thereonto. The only way the resolution of the CCD could be further increased is by increasing either the density of pixels in the CCD or the size of the device itself. Both approaches present significant problems. On one hand, the diffraction limit of light will ultimately impose limits on any photolithographic process utilized to pattern CCDs although constraints of practicality and cost will generally intervene first to set the limit on pixel density. On the other hand, processing constraints will limit the size of crystalline CCDs that can be manufactured. Single crystal wafers cannot generally be economically manufactured in sizes exceeding perhaps six to eight inches in diameter. Furthermore, processing steps can introduce defects into such devices. Increasing the size of a crystalline device, especially while maintaining strict limits on the size of the photolithographic features thereof imposes a great burden of cost insofar as the likelihood of creating defects exponentially increases along with a dramatic decrease in the yield of devices. The result is that the cost of finished product increases exponentially with increasing device size. It will thus be appreciated that even utilizing the most optimistically projected pixel densities and single crystalline CCD sizes, high resolution optical scanners adapted to sense a pattern of information in an area exceeding several square inches cannot be economically manufactured utilizing such technology.

Deposited thin film devices represent another approach to the fabrication of optical scanners. Thin film devices may be economically manufactured over large areas by the vapor deposition of layers of appropriate semiconductor materials onto a variety of substrates. By appropriately patterning these layers, for example, through the use of presently available photolithographic techniques, a variety of device configurations may be provided.

Recently, considerable progress has been made in developing processes for depositing thin film semiconductor materials. Such materials can be deposited to cover relatively large areas and can be doped to form p-type and n-type semiconductor materials for the production of semiconductor devices such as p-i-n type photodiodes equivalent, and in some cases superior to those produced by their crystalline counterparts. One particularly promising group of thin film materials are the amorphous materials. As used herein, the term "amorphous" includes all materials or alloys which have long range disorder although they may have short or intermediate range order, or even contain at times, crystalline inclusions. Also as used herein, the term "microcrystalline" is defined as a unique class of said amorphous materials characterized by a volume fraction of crystalline inclusions, said volume fraction of inclusions being greater than a threshold value at which the onset of substantial changes in certain key parameters such as electrical conductivity, band gap and absorption constant occur.

It is now possible to prepare by glow discharge, or other vapor deposition processes, thin film amorphous silicon, germanium or silicon-germanium alloys in large areas, said alloys possessing low concentrations of localized states in the energy gap thereof and high quality electronic properties. Techniques for the preparation of such alloys are fully described in U.S. Pat. Nos. 4,226,898 and 4,217,374 of Stanford R. Ovshinsky, et al., both of which are entitled "Amorphous Semiconductor Equivalent to Crystalline Semiconductors" and in U.S. Pat. Nos. 4,504,518 and 4,517,223 of Stanford R. Ovshinsky, et al., both of which are entitled "Method of Making Amorphous Semiconductor Alloys and Devices Using Microwave Energy"; the disclosures of all of the foregoing patents are incorporated herein by reference.

SUMMARY OF THE INVENTION

Thin film semiconductor alloys may be readily manufactured to cover large areas by mass production processes and therefore provide for the economic fabrication of large scale image sensor arrays. The use of such large arrays eliminates the need for optically reducing a pattern of information so as to conform that pattern to a small area sensor array, thereby eliminating the loss of resolution described above for CCD arrays. Additionally, since the thin film sensor arrays can be fabricated to be larger than the pattern of information being scanned, that pattern can be optically projected onto the array in an enlarged form thereby increasing the effective resolution of the array. In this manner, high resolution image reproduction may be achieved without the need for employing precision photolithographic techniques, thereby maintaining high product yields and low manufacturing costs.

For example, if a thin film photosensor array is fabricated having a 50 micron pitch, that is to say 50 microns center-to-center spacing between the adjacent photosensitive elements thereof, the array will provide a resolution of 20 lines/mm. This resolution is better than that attainable when scanning a 35 millimeter square pattern of information with presently available CCDs. A fifty micron pitch is readily achieved at very high yields utilizing conventional photolithographic techniques. If the pitch remained the same and a photosensor array of approximately 54 millimeters on an edge were fabricated, a 1.4 million pixel array would be realized. Thus, it may be seen that by increasing the size of the photosensor array, and with presently available processing techniques, resolution equivalent to the best anticipated resolution for single crystal charge coupled devices is presently equaled. Since thin film photosensor arrays can be made in sizes up to several feet, even assuming no new advances in said technology, the resolving power of charge coupled devices can be exceeded by orders of magnitude with such thin film arrays.

While the foregoing discussion is based upon the use of a 50 micron pitch, a 29 micron pitch or better is readily achieved in the fabrication of thin film photosensor arrays. Use of a 29 micron pitch will increase the pixel total of the aforementioned 35 square millimeter array to 1.4 million and by utilizing still larger arrays, even higher resolutions may be achieved. Techniques for the fabrication of two dimensional photosensor arrays are found in commonly assigned U.S. patent application Ser. No. 607,153 entitled "Contact Type Document Scanner And Method", filed May 4, 1984, now U.S. Pat. No. 4,660,095, the disclosure of which is incorporated herein by reference.

In addition to the use of two dimensional arrays as described in the foregoing paragraph, the principles of the instant invention may be similarly employed in conjunction with linear arrays. Sensing a pattern of information may be accomplished with a linear array of photosensitive elements by scanning, or passing that array across the pattern of information. It is presently possible to fabricate linear photosensor arrays in sizes exceeding several meters. The use of such arrays in conjunction with the projection of an enlarged image there provides for ultra-high resolution photosensing of informational patterns. Techniques for the fabrication of such large arrays are found in U.S. patent application Ser. No. 885,907, now U.S. Pat. No. 4,725,889, filed July 15 1986 and entitled "Photosensitive Line Imager Utilizing A Movable Scanning Arm", the disclosure of which is incorporated herein by reference. As described in the foregoing references, it is possible to provide gray scale and color sensitivity to thin film photosensor arrays and by utilizing such capabilities, full color, high resolution images may be readily reproduced.

It may be seen that the instant invention eliminates constraints heretofore present in optical scanning systems utilizing charge coupled or similar integrated circuits fabricated on single crystal wafers devices as photosensors. The present invention thus makes possible high resolution optical scanning systems which are easy to fabricate, low in cost and adaptable for the scanning of graphic and/or alpha-numeric data.

These and other advantages of the instant invention will be apparent to those skilled in the art from the brief description of the invention, the drawings, the detailed description of the drawings and the claims which follow.

There is disclosed herein a method for the high resolution sensing of a pattern of information with a thin film photosensor array as well as apparatus for carrying out the method. The method includes the steps of providing a thin film photosensor array, providing optical means adapted to generate an enlarged image of a pattern of information, projecting said enlarged image for sensing by said photosensor array and sensing the enlarged image with the thin film photosensor array so as to provide a signal corresponding thereto.

The apparatus includes optical means adapted to generate an enlarged image of the pattern of information and a thin film photosensor array disposed so as to sense the enlarged image and provide a signal corresponding thereto. In one embodiment, the thin film photosensor array includes at least one layer of semiconductor material chosen from the group consisting essentially of: amorphous silicon alloy materials, amorphous germanium alloy materials, and amorphous silicon germanium alloy materials. The optical means may include a lens or a mirror. In some instances the optical means is adapted to project the enlarged image directly onto the thin film photosensor array whereas in other instances it is adapted to project the image onto a screen and the thin film photosensor array is disposed so as to sense the image projected on the screen.

The pattern of information may be a transparency which is projected by the optical means to form an enlarged image thereof. In other instances the pattern of information may be a three dimensional body and the optical means may be adapted to generate an enlarged two dimensional image of at least a portion of the surface of the three dimensional body. The thin film photosensor array may comprise a planar array or may be a flexible array contoured to generally correspond to the focal plane of the optical means.

The thin film photosensor array may be a linear array of photosensitive elements, in which case the apparatus will further include means for scanning the enlarged image with the linear array. In other instances the thin film photosensor array is a two dimensional array. The photosensor array may include photoresponsive elements selected from the group consisting essentially of photodiodes, phototransistors, photoconductive devices, photovoltaic devices, and combinations thereof. In some instances the photoresponsive devices of the array may include two oppositely doped layers of semiconductor material and in yet other instances, may also include a layer of substantially intrinsic semiconductor material interposed therebetween.

The apparatus may be adapted to provide a digital signal or an analog signal corresponding to the pattern of information being sensed and may further include a display device or a printer.

One specific embodiment of the instant invention includes a method and apparatus for providing an electronic signal indicative of the pattern of information in a fingerprint. This apparatus includes optical means adapted to project an enlarged image of the fingerprint and a thin film photosensor array disposed so as to sense the enlarged image and provide a corresponding output signal.

DETAILED DESCRIPTION OF THE DRAWINGS

Figure 1:
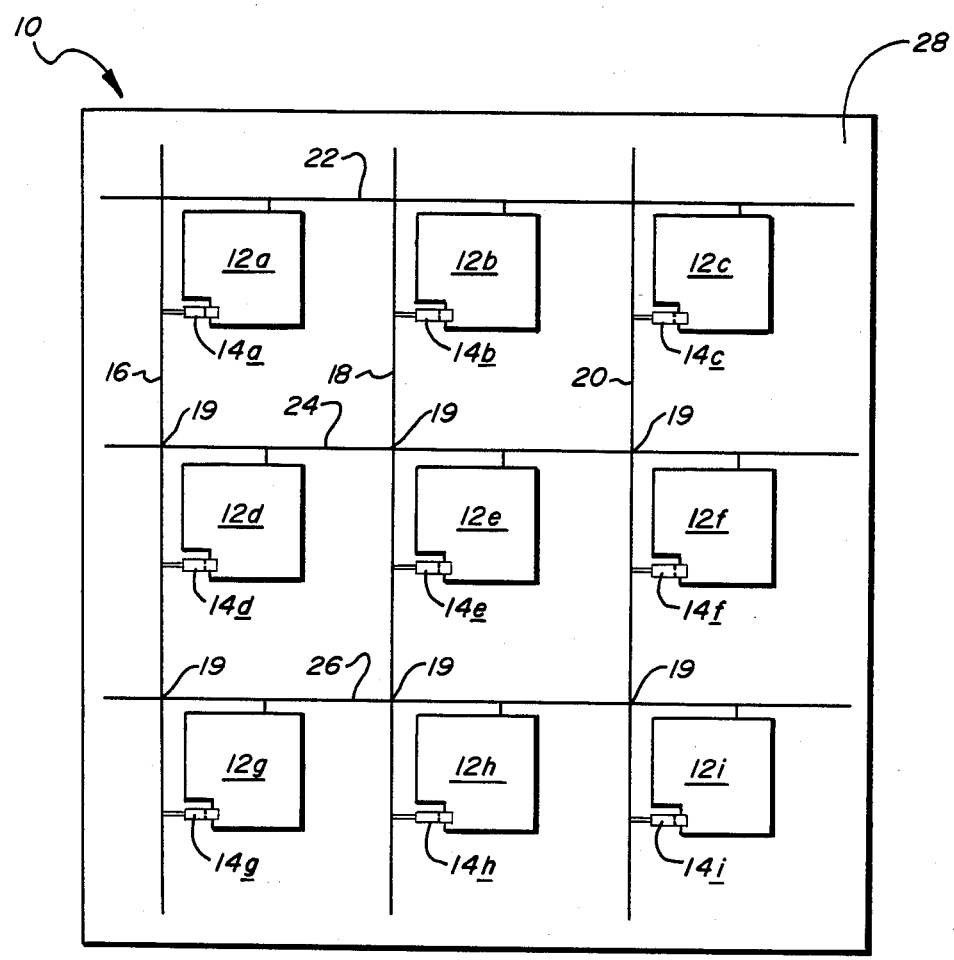
FIG. 1 is a top plan view of one particular type of thin film photosensor array which may be utilized in the practice of the instant invention.

Referring now to FIG. 1, there is shown in top plan view one particular thin film photosensor array 10, typical of those which may be utilized in the practice of the present invention, it being kept in mind that other photosensor arrays may be similarly employed.

The photosensor array 10 is comprised of a plurality of photosensitive elements 12a-12i arrayed in a two-dimensional matrix form. Each of the photosensitive elements, 12a-12i, has associated therewith an isolation device 14a-14i interconnecting that element 12 to a grid of address lines. As illustrated the grid includes a plurality of X address lines 16, 18 and 20 and a plurality of Y address lines 22, 24 and 26, formed of an electrically conductive material such as a metal or the like.

The photosensor array 10 is formed upon a substrate 28, which may be a rigid member substrate such as a glass, or metallic plate, or a flexible member such as a thin metallic member, or a sheet of synthetic polymeric material. In those instances where the substrate 28 is electrically conductive, it may be desirable to provide an insulating coating thereatop prior to the deposition of the address lines thereon.

The photosensor elements 12a-12i are photoresponsive elements, that is to say they are adapted to produce a detectable signal in response to the absorption of illumination. This signal may comprise a current, a voltage, a change in resistivity or the like. Among devices which may be utilized as photosensors 12, are photodiodes, phototransistors, photoconductive devices, photovoltaic devices and the like taken either singly or in combination. One group of photosensor devices having particular utility are p-i-n photovoltaic devices comprised of two oppositely doped layers of semiconductor material having a body of substantially intrinsic semiconductor material therebetween. Such devices may be used either singly or in stacked tandem combinations to produce voltage and/or current in response to the absorption of illumination.

The isolation device 14, associated with each of the photosensor elements is utilized to restrict the flow of electrical current through the photosensor array 10 to predetermined paths so as to facilitate addressing of particular photosensor elements 12. The isolation device 14 may comprise any type of control device such as a diode, a transistor, a threshold switch, a relay or the like. P-I-N type diodes have been found to be particularly useful in the fabrication of photosensor arrays.

The address lines 16, 18, 20, 22, 24 and 26 are arrayed in a X-Y matrix and electrically isolated at cross-over points 19. By addressing particular pairs of address lines, distinct photosensors may be accessed. For example, by addressing line 24 and line 18 sensor 12e is accessed. The presence of the blocking devices 14 on adjoining elements prevents the communication of unwanted electrical signals during addressing.

While a very wide variety of materials may be adapted to fabricate sensor arrays having utility in the instant invention, it has been found particularly advantageous to utilize thin film semiconductor alloy materials chosen from the group consisting essentially of amorphous silicon alloy materials, amorphous germanium alloy materials and amorphous silicon germanium alloy materials. Such materials may be readily formed into large size photosensor arrays. As utilized herein, the term amorphous silicon alloy materials refers to those alloys of silicon with other elements or materials as for example, compensating or modifying elements such as hydrogen, halogens, carbon and/or nitrogen. Similarly, the term germanium alloy materials shall refer to germanium in combination with other elements or materials. The term amorphous silicon germanium alloy shall include all alloys which include both silicon and germanium in any proportion with or without other elements or materials.

It will be apparent to one of skill in the arts that while the photosensor array 10 of FIG. 1 is depicted as being a two dimensional matrix comprised of nine photosensor elements, in practicality an array comprised of a much larger number of elements will generally be preferred. It will also be apparent that while the array 10 of FIG. 1 is depicted as being a two dimensional array similar technology may be readily modified to provide a one dimensional, i.e. linear, array. Detailed descriptions of the operations and fabrication of both one and two dimensional sensor arrays will be found in the patents referred to and incorporated by reference hereinabove.

Figure 2:
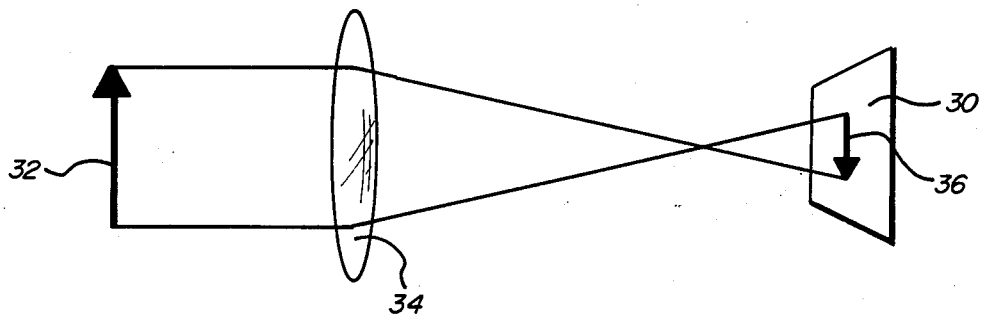
FIG. 2 is a schematic illustration of a prior art optical scanning system utilizing a single crystalline charge coupled device.
Figure 3:
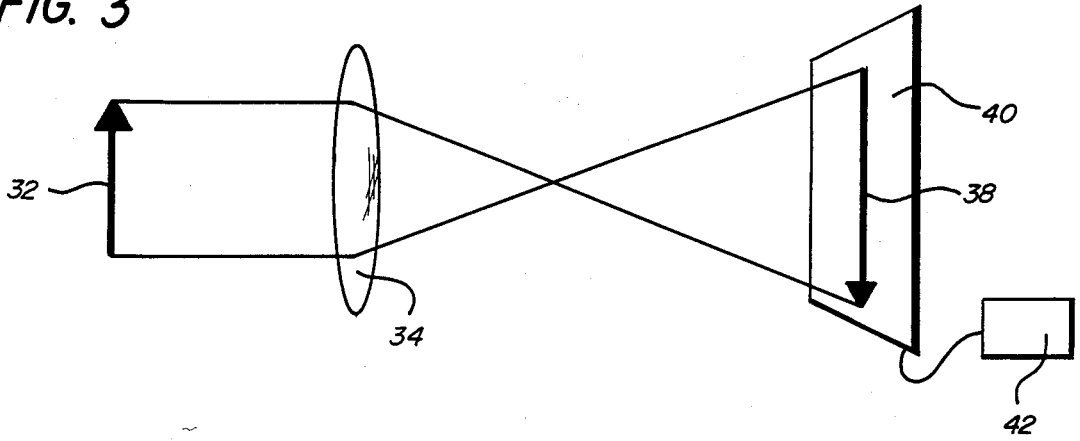
FIG. 3 is a schematic illustration of an optical scanning system of the present invention as adapted to utilize a two dimensional, thin film photosensor array.
Figure 4:
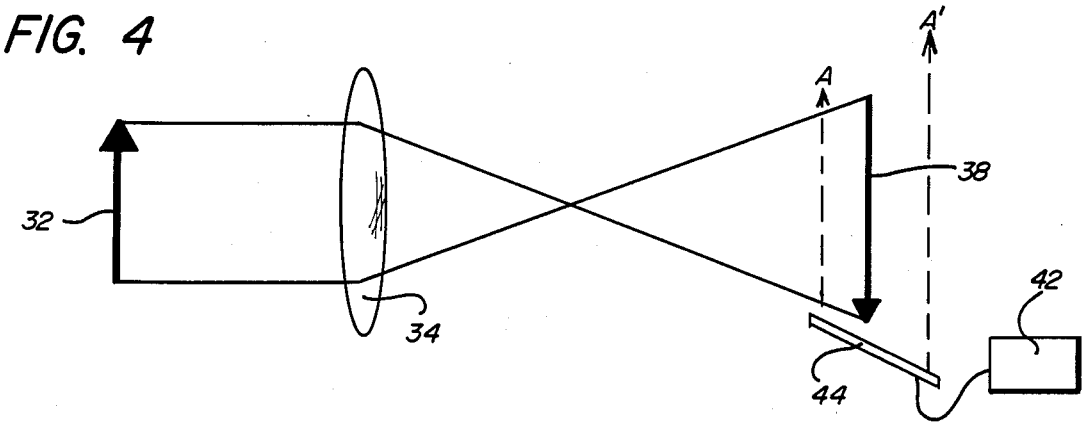
FIG. 4 is a schematic illustration of an optical scanning system of the instant invention as adapted to utilize a linear, thin film photosensor array.

The operation and advantages of the instant invention will best be understood with reference to FIGS. 2, 3 and 4. Referring now to FIG. 2, there is illustrated in schematic form an apparatus as adapted for sensing of a pattern of information with a charge coupled device. As such, FIG. 2 represents the state of the prior art.

In the method of FIG. 2, a charge coupled device, such as a two dimensional, single crystalline charge coupled device 30 is disposed so as to sense a pattern of information embodied in an object 32, shown here as an arrow. Since the object 32 is larger than the active area of the charge coupled device 30, an optical system, represented here schematically as a lens 34 is utilized to project a reduced size image 36 of the object 32 onto the charge coupled device 30.

As mentioned previously such reduction is derogatory of effective resolution. If the charge coupled device 30 is 1 centimeter square and includes 256,000 pixels, it will have a resolving power of approximately 50 lines per millimeter. If the object 32 being sensed is 3.5 centimeters long and is projected in a reduced form to provide an image 36 which fills the active area of the charge coupled device 30; that object 32, will be imaged with an effective resoultion of approximately 15 lines per millimeter.

Referring now to FIG. 3, there is shown also in schematic form one embodiment of the instant invention as adapted to provide for the high resolution sensing of a pattern of information. The illustrated embodiment depicts an object 32 and an optical system shown as a lens 34, as disposed to project an image 38 of the object 32 onto a thin film photosensor array 40. What is noteworthy about FIG. 3 is that the projected image 38 is considerably larger than the original object 32.

The photosensor array 40 is a thin film photosensor array generally similar to those described with reference to FIG. 1. By projecting an enlarged image 38 onto the photosensor array 40, effective resolution of the array is increased. For example, photosensor arrays may be readily fabricated in high yield having a pitch of approximately 50 microns, that is to say a center-to-center spacing of 50 microns between adjacent photosensor elements. This provides a resolution of 20 line pairs per millimeter, a number exceeding the effective resolution of the charge coupled device in the FIG. 2 embodiment. If the image 38 of the object 32 being sensed is being projected onto the array 40 at a twofold magnification this resolution will effectively be doubled. Still higher magnifications will produce correspondingly greater effective resolution values. Prior to the advent of large area thin film photosensor arrays, such high degrees of resolution could not be readily attained in electronic imaging systems. It should be apparent that by further enlarging the image 38 and by further increasing the size of the sensor array 40, extremely high resolution images may be obtained.

As depicted in the Figure, the photosensor array 40 has downstream signal processing equipment 42 associated therewith. Such downstream processing equipment may include a computer for enhancing, manipulating or otherwise processing images produced by the sensor array. The downstream processing apparatus may also include a video display terminal or printing apparatus for producing an image of the object being sensed; likewise, downstream processing may include storage apparatus such as a magnetic disk or an optical disk.

FIG. 4 illustrates still another embodiment of the present invention utilizing a linear array of photosensors 44 to scan a projected image 38 of an object 32. Although not shown, the apparatus of the FIG. 4 embodiment may include drive means to advance the linear photosensor array 44 across the plane of the image 38, as indicated by broken arrows A, A'. Alternatively, the optical system 34, may be adapted to sweep the projected image 38 across the linear array 44.

Keeping in mind the basic principles of the instant invention it will be readily apparent that numerous apparatus and methods may be implemented in accordance therewith. For example, the optical system although indicated by a lens 34 in the Figures, may alternatively include a mirror or other such optical element for providing the enlarged image. Furthermore, the object being imaged may comprise a three dimensional solid body, which has a two dimensional representation thereof projected onto the photosensor array, but in other instances the object being imaged may be a planar member, such as a photograph, a page of text or a pattern upon a sheet of material, which is projected onto the sensor array. In yet other instances, the object bearing the pattern of information being scanned may comprise a transparency which is projected onto the sensor array by an optical system akin to that of a slide projector. In some instances, it may be more expedient to project the image of the object onto a translucent screen, and to then scan the screen with the photosensor array.

The present invention will have utility in many imaging applications, such as systems for the scanning, transmitting and processing of data. One such embodiment is as a fingerprint scanning device adapted to sense the pattern of information present in a fingerprint and provide an electrical signal indicative thereof. Fingerprint patterns may be readily provided on transparent or semi-transparent media such as paper, plastic films, glass and the like by conventionally applying ink to the surface of a finger and contacting it to the medium; an image sensing system structured in accord with the present invention may then be utilized to scan the fingerprint image. High resolution transparency images of fingerprints, or other such topological features of tissue may be instantaneously recorded in a photodispersion film by the application of a brief light and/or heat pulse thereto. The method and apparatus for practice of such invention are disclosed in U.S. Pat. No. 4,251,564 entitled "Heat Sink Imaging Method And Apparatus For Live Skin Tissue Using Pulsed Energy Source," the disclosure of which is disclosed herein by reference.

By appropriately disposing a fingerprint transparency image produced by the aforementioned method in an optical system, a high resolution enlarged image of the fingerprint pattern may be readily projected onto a photosensor array for the generation of an electrical signal corresponding thereto. Once digitized, the information on the fingerprint may be analyzed and encoded through a cross reference scheme for later analysis, retrieval, or transmission to remote locations for storage or display.

As will be apparent to one skilled in the art, other such embodiments of the instant invention may be similarly implemented. Thin film photosensor arrays may be readily fabricated in large areas upon flexible substrates making them adaptable for a wide variety of imaging applications. The sensor array need not be planar as shown in the Figures, but may curved so as to accomodate the optical system being employed. For example, if an optical system has a degree of abberation producing a curved plane of focus, a flexible array of photosensors may be disposed so as to correspond to this curved image plane. Thin film photosensor arrays may be readily fabricated in very large areas and accordingly may be utilized with optical systems giving high magnification ratios to produce ultra-high resolution image scans. It is the essential feature of the instant invention that resolution of an imaging array is enhanced by the use of optical enlargement of a data pattern prior to sensing thereof. Such an arrangement allows for very high resolution scanning and permits the use of relatively coarse featured photolithography in the preparation of the sensor arrays.

The foregoing examples and description are merely meant to be illustrative of some aspects of the instant invention, and not limitations thereupon. It is the following claims, including all equivalents, which define the scope of the invention.

We claim:

1. Apparatus for the high resolution sensing of a pattern of information, said apparatus comprising:
   optical means adapted to generate an enlarged image of the pattern of information;
   a thin film photosensor array operatively disposed relative to said optical system so as to sense the enlarged image and provide a signal corresponding thereto; and
   said thin film photosensor array including a plurality of layers of semiconductor material chosen from the group consisting essentially of: amorphous silicon alloy materials, amorphous germanium alloy materials, and amorphous silicon germanium alloy materials.

2. Apparatus as in claim 1, wherein said optical means include a lens.

3. Apparatus as in claim 1, wherein said optical means include a mirror.

4. Apparatus as in claim 1, wherein said optical means is further adapted to project the enlarged image directly onto the thin film photosensor array.

5. Apparatus as in claim 1, wherein said optical means is further adapted to project the enlarged image onto a screen and the thin film photosensor array is disposed so as to sense the image on the screen.

6. Apparatus as in claim 1, wherein the pattern of information is a transparency and said optical means is adapted to project an enlarged image of the transparency.

7. Apparatus as in claim 1, wherein the pattern of information is a three dimensional body and said optical means is adapted to generate an enlarged two dimensional image of at least a portion of the surface of said three dimensional body.

8. Apparatus as in claim 1, wherein the thin film photosensor array is a planar array.

9. Apparatus as in claim 1, wherein said optical means is adapted to generate an enlarged image at a focal plane thereof and the thin film photosensor array is flexible and has a contour generally corresponding to the focal plane of the optical means.

10. Apparatus as in claim 1, wherein said thin film photosensor array is a linear array of photosensitive elements;
    said apparatus further including means for scanning said enlarged image with the linear photosensor array.

11. Apparatus as in claim 1, wherein said thin film photosensor array is a two dimensional photosensor array.

12. Apparatus as in claim 1, wherein said thin film photosensor array includes photoresponsive elements selected from the group consisting essentially of: photodiodes, phototransistors, photoconductive devices, photovoltaic devices, and combinations thereof.

13. Apparatus as in claim 1, wherein said thin film photosensor array includes a plurality of photoresponsive devices, each device including two oppositely doped layers of semiconductor material.

14. Apparatus as in claim 13, wherein said thin film photosensor array includes a layer of substantially intrinsic semiconductor material interposed between said oppositely doped semiconductor layers.

15. Apparatus as in claim 1, adapted to provide a digital electronic signal corresponding to the pattern of information being sensed.

16. Apparatus as in claim 1, adapted to provide an analog signal corresponding to said pattern of information.

17. Apparatus as in claim 1, further including a display device and adapted to provide a high resolution display of the pattern of information.

18. Apparatus as in claim 1, further including a printer, said apparatus adapted to provide a high resolution hard copy of the pattern of information.

19. Apparatus as in claim 1, wherein the pattern of information is a fingerprint.

* * * * *